United States Patent [19]
Yamazaki et al.

[11] Patent Number: 5,606,954
[45] Date of Patent: Mar. 4, 1997

[54] EVAPORATIVE FUEL PROCESSING DEVICE

[75] Inventors: Kazumi Yamazaki; Takeaki Nakajima; Koichi Hidano; Teruo Wakashiro; Takeshi Hara; Masaaki Horiuchi, all of Wako; Tomoyuki Kawakami, Tochigi, all of Japan

[73] Assignee: Honda Giken Kogyo Kabushiki Kaisha, Tokyo, Japan

[21] Appl. No.: 362,267

[22] Filed: Dec. 22, 1994

[30] Foreign Application Priority Data

Dec. 22, 1993 [JP] Japan .................................. 5-324395
Jul. 8, 1994 [JP] Japan .................................. 6-157105

[51] Int. Cl.$^6$ .................................................. F02M 37/04
[52] U.S. Cl. .......................................... 123/520; 123/516
[58] Field of Search .................................. 123/516, 520, 123/518, 519, 521

[56] References Cited

U.S. PATENT DOCUMENTS

| | | | |
|---|---|---|---|
| 4,932,444 | 6/1990 | Micek | 123/519 |
| 4,944,779 | 7/1990 | Szlaga | 123/519 |
| 5,024,687 | 6/1991 | Waller | 123/519 |
| 5,123,459 | 6/1992 | Toshihiro | 123/520 |
| 5,209,210 | 5/1993 | Ikeda | 123/520 |
| 5,215,132 | 6/1993 | Kobayashi | 123/518 |
| 5,318,069 | 6/1994 | Harris | 123/519 |
| 5,417,240 | 5/1995 | Benjay | 123/519 |
| 5,431,144 | 7/1995 | Hyodo | 123/520 |

FOREIGN PATENT DOCUMENTS

| | | | |
|---|---|---|---|
| 0130254 | 5/1990 | Japan | 123/519 |
| 0119667 | 5/1990 | Japan | 123/519 |

Primary Examiner—Carl S. Miller
Attorney, Agent, or Firm—Nikaido, Marmelstein, Murray & Oram LLP

[57] ABSTRACT

In an evaporative fuel processing device, an evaporative fuel passage communicating at one end to an upper space in a fuel tank is connected at the other end to a refueling line at a location corresponding to a negative pressure introducing hole provided in a lower portion of a tip end of a nozzle during refueling by a refueling nozzle which is constructed so that the refueling by the refueling nozzle is automatically stopped in response to a fuel liquid level reaching the negative pressure introducing hole during refueling. The draft resistance of an evaporative fuel passage interconnecting an inlet of the refueling line and a tank body is set larger than the draft resistance of an evaporative fuel passage interconnecting the tank body and a canister. Thus, the releasing of evaporative fuel from the fuel tank during refueling is effectively inhibited without use of a potentially unreliable seal.

9 Claims, 14 Drawing Sheets

Rate of draft resistance ($R_2/R_1$)

Rate of draft resistance ($R_2/R_1$)

EVAPORATIVE FUEL PROCESSING DEVICE

BACKGROUND OF THE INVENTION

1. Field of the Invention

The present invention relates to an evaporative fuel processing device for suppressing the release of evaporative fuel from a fuel tank during refueling with a refueling nozzle.

2. Description of the Prior Art

A conventionally known evaporative fuel processing device is disclosed in Japanese Patent Application Laid-Open No. 53451/86. In this prior art device, evaporative fuel generated from a fuel tank during refueling with the refueling nozzle is adsorbed in a canister, and the release of evaporative fuel from a refueling line to the outside is inhibited by bringing a seal provided in the refueling line into close contact with an outer periphery of the refueling nozzle. However, the durability of the seal is very limited. If the seal becomes deteriorated or is damaged due to repetitive refueling, the release of evaporative fuel from the refueling line to the outside cannot be avoided.

SUMMARY OF THE INVENTION

Accordingly, it is an object of the present invention to provide an evaporative fuel processing device wherein the release of evaporative fuel from the refueling line during refueling can be effectively prevented without the use of an unreliable and possibly defective seal.

To achieve the above object, according to a first aspect and feature of the present invention, there is provided an evaporative fuel processing device, comprising a fuel tank having a refueling line extending upwardly, and a canister for adsorbing evaporative fuel from the fuel tank. An on-off valve is provided which is opened during refueling by a refueling nozzle to permit communication between the fuel tank and the canister. The refueling nozzle is constructed such that refueling by the refueling nozzle is automatically stopped in response to a fuel liquid level reaching a negative pressure introducing hole provided in a lower portion of a tip end of the nozzle to be inserted into the refueling line. The evaporative fuel processing device further includes an evaporative fuel passage communicating at one end thereof with an upper space in the fuel tank and connected at the other end to the refueling line at a location corresponding to the negative pressure introducing hole of the nozzle during refueling.

With the first feature, by passing evaporative fuel from the evaporative fuel passage into the negative pressure introducing hole of the refueling nozzle, it is possible to effectively and efficiently prevent the release of evaporative fuel from the refueling line without use of the conventionally used seal, or if such a seal is used but is defective. It is also possible to decrease the amount of air drawn into the refueling line during refueling by the refueling nozzle to contribute to a reduction in size of the canister.

In addition to the first feature, according to a second feature of the present invention, the evaporative fuel passage has a cross-sectional area for limiting the flow of evaporative fuel by itself, or has a limiting means for limiting the flow of evaporative fuel.

With the second feature, it is possible to avoid the needless flow of evaporative fuel toward the refueling line to effectively prevent surplus evaporative fuel which is not drawn into the negative pressure introducing hole from being released into the atmosphere.

Further, in addition to the first feature, according to a third feature of the present invention, the evaporative fuel processing device further including a guide member onto which the tip end of the nozzle is placed during refueling and which is mounted within the refueling line, the guide member being provided with a plurality of connection holes at distances from one another in an axial direction of the refueling line to commonly lead to the evaporative fuel passage.

With the third feature, it is possible to reliably connect the negative pressure introducing hole to the evaporative fuel passage in accordance with the depth of insertion of the nozzle of the refueling nozzle, thereby effectively preventing the release of evaporative fuel to the atmosphere.

Further, according to a fourth aspect and feature of the present invention, there is provided an evaporative fuel processing device, comprising a fuel tank including a tank body and a refueling line mounted to the tank body to extend upwardly, and a canister for adsorbing evaporative fuel from the tank body. A first evaporative fuel passage interconnects the tank body and the canister, and a second evaporative fuel passage interconnects an inlet of the refueling line and the tank body. A draft resistance of the second evaporative passage is set to be larger than that of the first evaporative fuel passage.

Due to this fourth aspect of the invention, it is possible to suppress the amount of evaporative fuel passed into the second evaporative fuel passage to suppress the releasing of evaporative fuel to the outside, while suppressing the inclusion of fresh air into the tank body during refueling without use of the conventionally used seal.

Yet further in addition to the fourth feature, according to a fifth feature of the present invention, the evaporative fuel processing device further includes a valve provided in a connected portion of the first evaporative fuel passage to the tank body, wherein the valve closes in response to the fuel liquid level within the tank body reaching a highest level, so as to close the first evaporative fuel passage. The second evaporative fuel passage diverges from the first evaporative fuel passage at a location downstream from the valve.

With the fifth feature, it is possible to easily enhance the accuracy of setting of the fuel liquid level within the tank body.

In addition, according to a sixth feature of the present invention, the evaporative fuel processing device further includes a shutter mounted in the inlet of the refueling line and capable of being opened in response to the insertion of a refueling nozzle into the refueling line. The second evaporative fuel passage is connected to the refueling line at a location nearer the tank body than the shutter.

With the sixth feature, it is possible to cause evaporative fuel from the second evaporative fuel passage to more effectively combine with fuel flow from the refueling nozzle, thereby more effectively suppressing the release of evaporative fuel to the atmosphere.

BRIEF DESCRIPTION OF THE DRAWINGS

The above and other objects, features and advantages of the invention will become apparent from the following description of preferred embodiments taken in conjunction with the accompanying drawings, wherein.

DESCRIPTION OF THE PREFERRED EMBODIMENTS

Figure 1:
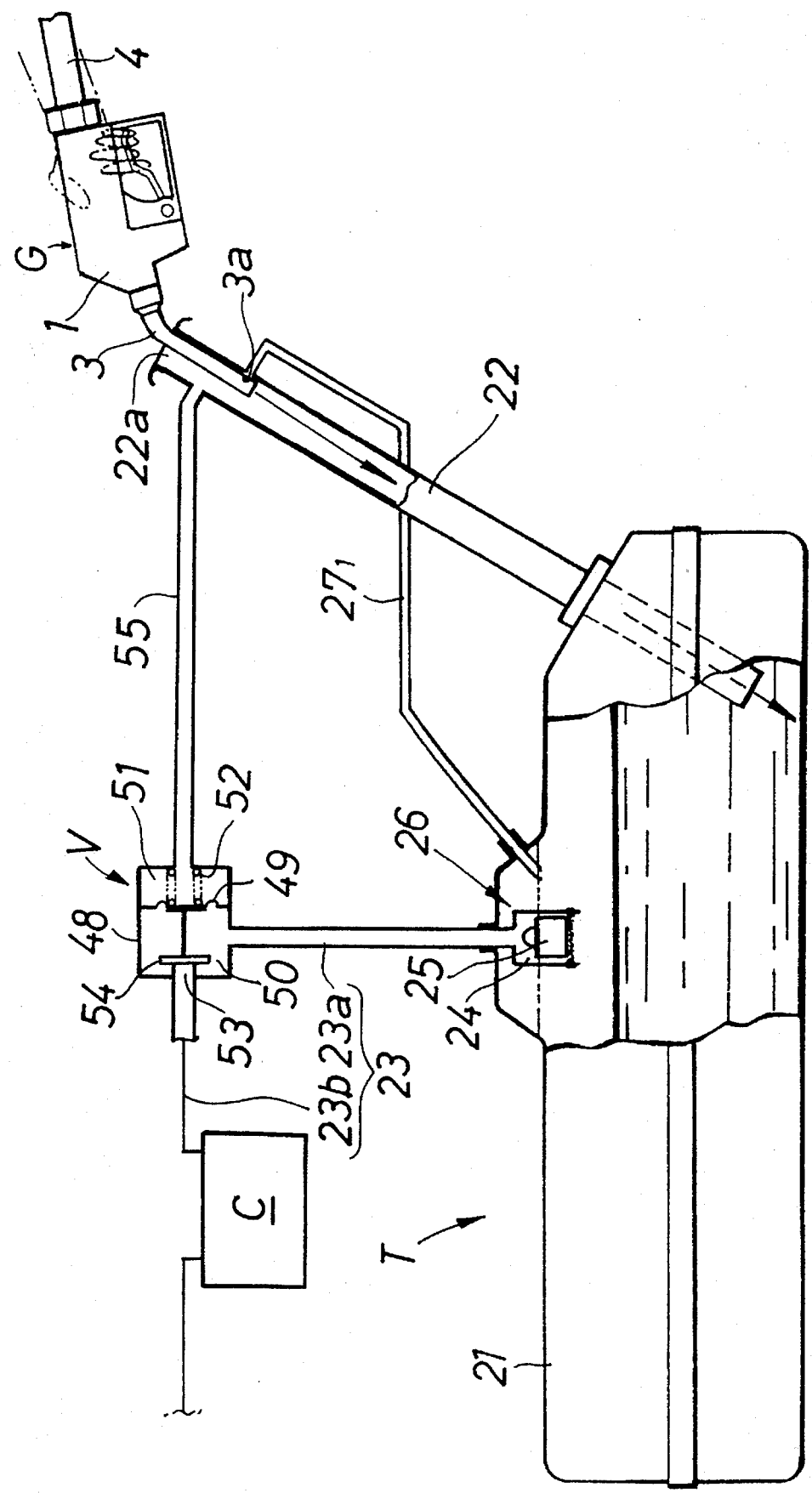
FIG. 1 is a cutaway sectional view illustrating the construction of an evaporative fuel processing device according to a first embodiment of the invention.
Figure 2:
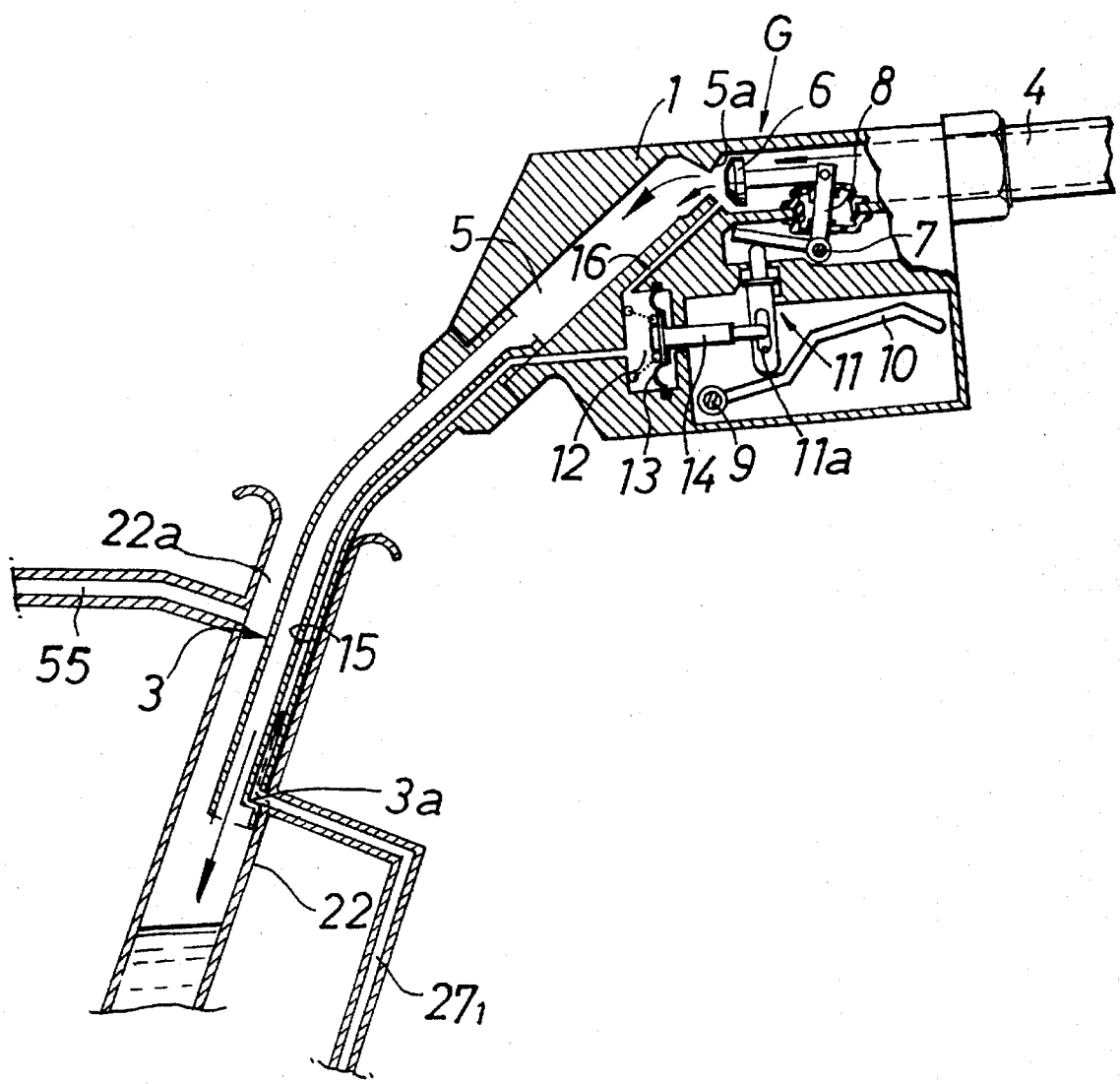
FIG. 2 is a sectional view of a refueling nozzle.

FIGS. 1 and 2 illustrate a first embodiment of the present invention. FIG. 1 is a cutaway sectional view of an evaporative fuel processing device, and FIG. 2 is a sectional view of a refueling nozzle.

Referring first to FIG. 1, a fuel tank T includes a tank body 21, and a refueling line 22 extending laterally and upwardly from the tank body 21. The refueling line 22 is provided at an upper end thereof with a refueling opening 22a of a large diameter. A first evaporative fuel passage 23 is connected at its one end to an upper portion of the tank body 21. A canister C for adsorbing evaporative fuel from the fuel tank T is connected to the other end of the first evaporative fuel passage 23. Moreover, a float valve 26 having a float chamber 24 and a float 25 is mounted at a connection of the first evaporative fuel passage 23 into the tank body 21. The float valve 26 is closed when a fuel liquid level within the fuel tank T reaches a level shown by a dashed line. During refueling into the fuel tank T, the float valve 26 is in an opened state.

An on-off valve V is incorporated in an intermediate portion of the first evaporative fuel passage 23 and opened when the fuel is supplied. A peripheral edge of a diaphragm 49 is clamped in a housing 48 of the on-off valve V. The inside of the housing 48 is divided by the diaphragm 49 into a valve chest 50 leading to a portion 23a of the first evaporative fuel passage 23 adjacent the fuel tank T, and a spring chamber 51. A spring 52 is accommodated in the spring chamber 51 for biasing the diaphragm 49 toward the valve chest 50. A valve member 54 capable of opening and closing a valve bore 53 leading to a portion 23b of the first evaporative fuel passage adjacent the canister C is accommodated in the valve chest 50 and connected to the diaphragm 49. Moreover, the spring chamber 51 is in communication with the refueling opening 22a of the refueling line 22 through a communication passage 55.

When the refueling opening 22a is closed, a differential pressure for causing the valve member 54 of valve V to displace the diaphragm 49 to a position to open the valve bore 53 cannot be produced between the valve chest 50 and the spring chamber 51. Therefore, the on-off valve V is maintained in a closed state. However, when the refueling opening 22a is opened to supply the fuel into the fuel tank T by the refueling nozzle G, the diaphragm 49 is displaced to a position to reduce the volume of the spring chamber 51 in accordance with an increase in pressure in the fuel tank T, i.e., with an increase in pressure in the valve chest 50. In response to this, the valve member 54 opens the valve bore 53 and thus, during refueling, the on-off valve is in the opened state.

When fuel is supplied to the fuel tank T, a nozzle 3 of the refueling nozzle G, as a nozzle portion according to the invention, is inserted into the refueling opening 22a of the refueling line 22. The refueling nozzle G is of conventionally well-known type including a negative pressure-operated automatic-stopping mechanism for automatically stopping the refueling, when the fuel liquid level has been risen to near the refueling opening 22a of the refueling line 22. The outline of the construction of the refueling nozzle G will be described below.

Referring to FIG. 2, the refueling nozzle G includes a gun body 1 which a fuel supplying personnel grasps, and the nozzle 3 which is inserted into the refueling opening 22a of the refueling line 22. A fuel passage 5 is provided in the gun body 1 to connect the refueling line 4 and the nozzle 3 to each other. A valve seat 5a whose flow path sectional area is constricted is formed in an intermediate portion of the fuel passage. An L-shaped link 8 is connected to the valve member 6 seatable on the valve seat 5a and is carried in the gun body 1 for pivotal movement about a pin 7. A locking member 11 is vertically slidably and swingably disposed between the link 8 and a lever 10 pivotally supported on the gun body 1 by a pin 9. A rod 14 extends from a diaphragm 13 accommodated in a negative pressure chamber 12 defined in the gun body 1 and is connected to an elongated hole 11a provided in the locking member 11. A negative pressure introducing hole 3a is provided in a lower portion of a tip end of the nozzle 3 to communicate with the negative pressure chamber 12 through an air passage 15. Further, a negative pressure passage 16 is in communication at its one end with the negative pressure chamber 12, and opens at the other end thereof into the fuel passage 5 in the vicinity of the valve seat 5a.

When the nozzle 3 of the refueling nozzle G is inserted into the refueling opening 22a and the lever 10 is pulled upwardly, the locking member 11 is moved upwardly to turn the link in a clockwise direction, thereby causing the valve member 6 to be separated away from the valve seat 5a. This permits the fuel from the refueling pipe 4 to be supplied through the fuel passage 5 and the nozzle 3 into the fuel tank T. During this time, a negative pressure is produced in the vicinity of the valve seat 5a whose flow path sectional area is constricted. But as long as the negative pressure introducing hole 3a opening into the lower portion of the tip end of the nozzle 3 is not closed, the negative pressure chamber 12 is maintained at atmospheric pressure, so that the diaphragm 13 is not operated to maintain the fuel supplying condition.

When the fuel tank T is filled up so that fuel liquid level rises within the refueling line 22 to close the negative pressure introducing hole 3a in the lower portion of the tip end of the nozzle 3 by the fuel, the negative pressure in the vicinity of the valve seat 5a is applied directly to the negative pressure chamber 12 to displace the diaphragm 13 leftwardly as viewed in FIG. 2. Thus, the load of the lever 10 is not transmitted to the link 8, and the valve member 6 is seated on the valve seat 5a under the pressure of the fuel flowing through the fuel passage 5 to stop the refueling.

In order to prevent evaporative fuel from being released to the outside from the refueling line 22 to the utmost during refueling by the refueling nozzle G, a second evaporative fuel passage $27_1$ having one end communicating with an upper space in the fuel tank T is connected at the other end thereof to the refueling line 22 at a location corresponding to the negative pressure introducing hole 3a in the nozzle 3 during refueling. The cross-sectional area of the second evaporative fuel passage $27_1$ is set to be smaller than that of the first evaporative fuel passage 23 in order to limit the flowing of evaporative fuel.

The operation of the first embodiment will be described below. When the fuel is supplied to the fuel tank T by the refueling nozzle G, the float valve 26 and the on-off valve V are opened. Therefore, evaporative fuel generated in the fuel tank T is passed through the first evaporative fuel passage 23 into the canister C and through the second evaporative fuel passage $27_1$ to the vicinity of the refueling opening 22a of the refueling pipe 22. An opening of the second evaporative fuel passage $27_1$ into the refueling line 22 is located in the vicinity of the negative pressure introducing hole 3a in the nozzle 3 of the refueling nozzle G inserted into the refueling opening 22a. Thus, evaporative fuel from the second evaporative fuel passage $27_1$ is drawn into the negative pressure introducing hole 3a, and evaporative fuel drawn into the refueling nozzle G is discharged toward the fuel tank T along with fuel. Therefore, a portion of evaporative fuel is circulated from the second evaporative fuel passage $27_1$ via the negative pressure introducing hole 3a and the refueling nozzle G into the fuel supply tank T. This makes it possible to minimize the escape of evaporative fuel to the atmosphere from the refueling line 22 and to reduce the amount of air drawn into the refueling line 22 with the refueling by the refueling nozzle G, thereby reducing the amount of evaporative fuel generated within the fuel tank T to contribute to the reduction in size of the canister C.

Moreover, the second evaporative fuel passage $27_1$ is formed with a small enough diameter to limit the flow of evaporative fuel, so that a surplus amount of evaporative fuel not drawn into the air passage 15 through the negative pressure introducing hole 3a can be effectively prevented from being released to the atmosphere.

Figure 3:
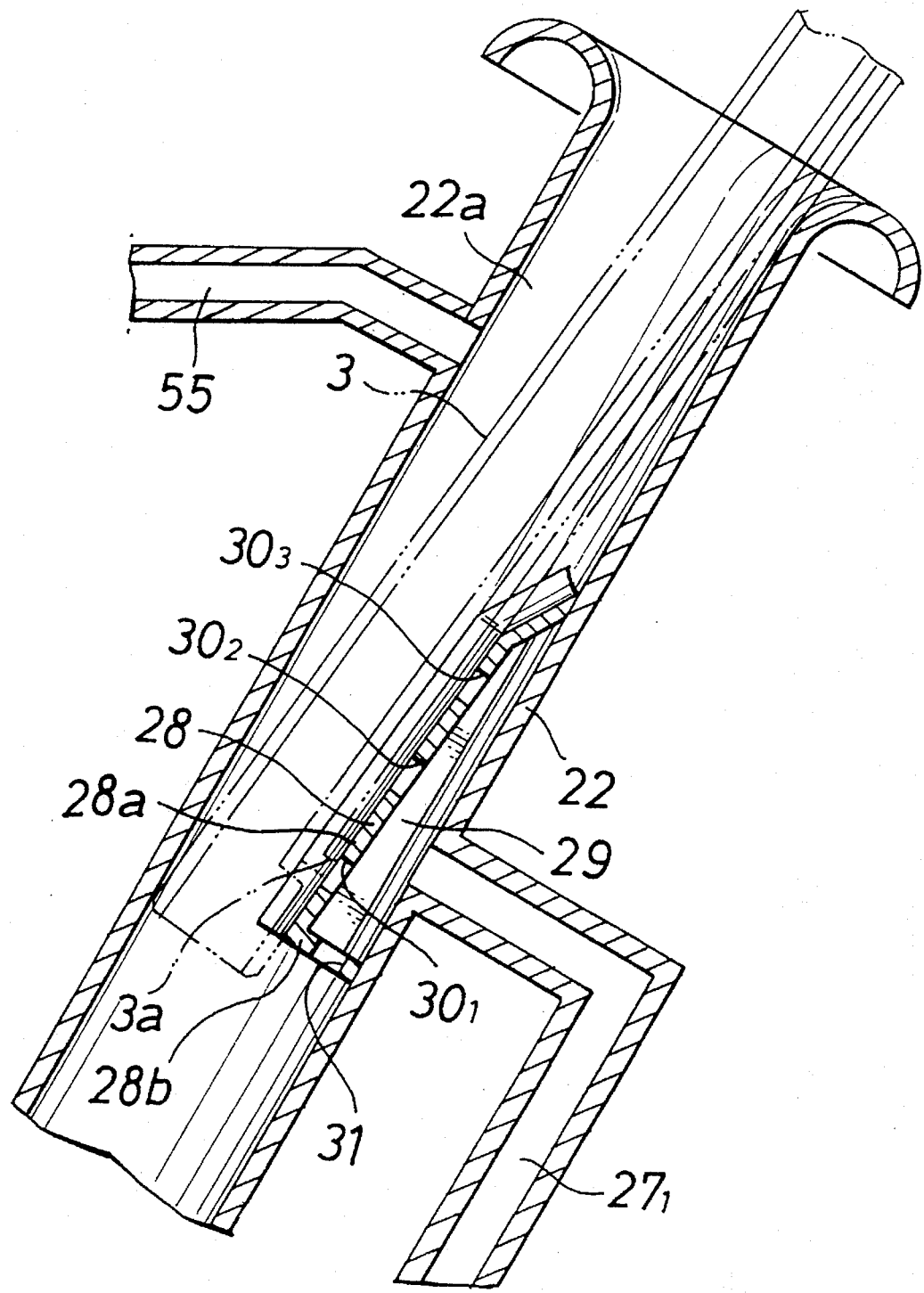
FIG. 3 is a sectional view of a portion of a refueling line near a fuel supply port, for a second embodiment of the invention.
Figure 4:
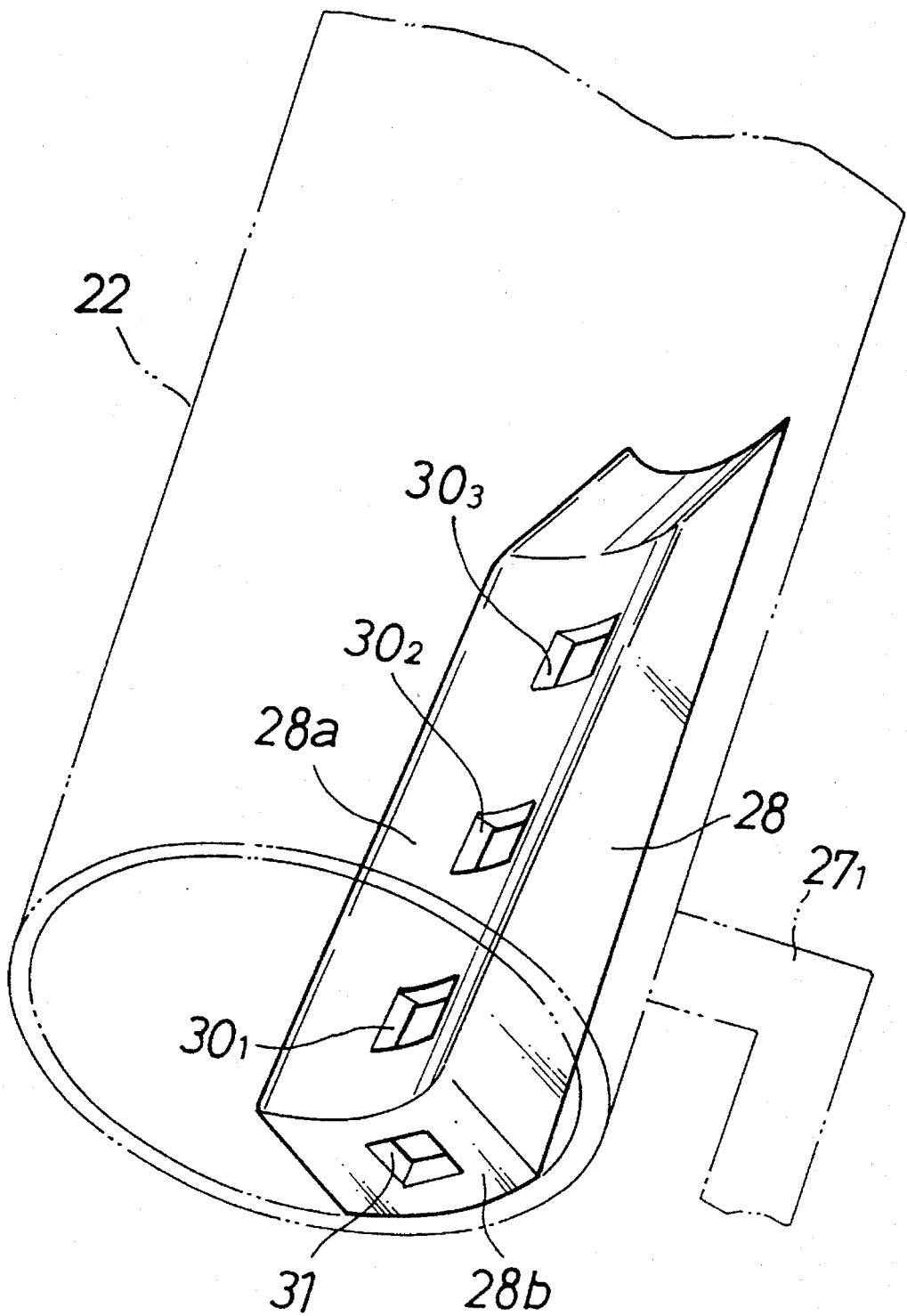
FIG. 4 is a perspective view of a guide member of the embodiment of FIG. 3.

FIGS. 3 and 4 illustrate a second embodiment of the present invention. FIG. 3 is a sectional view illustrating a portion of the refueling line near the refueling opening, and FIG. 4 is a perspective view of a guide member.

A guide member 28 is mounted on a lower surface of the refueling opening 22a of the refueling line 22, and the top end of the nozzle 3 of the refueling nozzle G is placed on the guide member 28. The guide member 28 has an upper surface 28a which is inclined away from an inner surface of the refueling line 22 in an axially inward direction of the refueling line 22, and formed into a circular arc in cross section to receive the lower portion of the tip end of the nozzle 3. An evaporative fuel chamber 29 is defined between the guide member 28 and the refueling line 22. The chamber 29 is connected to the second evaporative fuel passage $27_1$ when the guide member 28 is mounted to the refueling line 22. A plurality of connection holes $30_1$, $30_2$ and $30_3$ are provided in the upper surface 28a of the guide member 28 at distances spaced apart from one another in the axial direction of the refueling pipe 22 to commonly lead to the second evaporative fuel passage $27_1$ through the evaporative fuel chamber 29, and a passage 31 is provided in a front end of the guide member 28 to lead to the evaporative fuel chamber 29.

In the second embodiment, any of the connection holes $30_1$, $30_2$ and $30_3$ can reliably be connected to the negative pressure introducing hole 3a depending upon the depth of nozzle 3 inserted into the refueling line 22 by placing the tip end of the nozzle 3 of the refueling nozzle G onto the upper surface 28a of the guide member 28. Therefore, the effect of preventing the release of evaporative fuel to the outside can be enhanced. Moreover, when the fuel liquid level rises within the refueling line 22, the fuel can be introduced through the passage 31 into the evaporative fuel chamber 29. Therefore, the negative pressure introducing hole 3a can be closed by the fuel, causing the refueling nozzle G to exhibit an automatic-stopping function.

Figure 5:
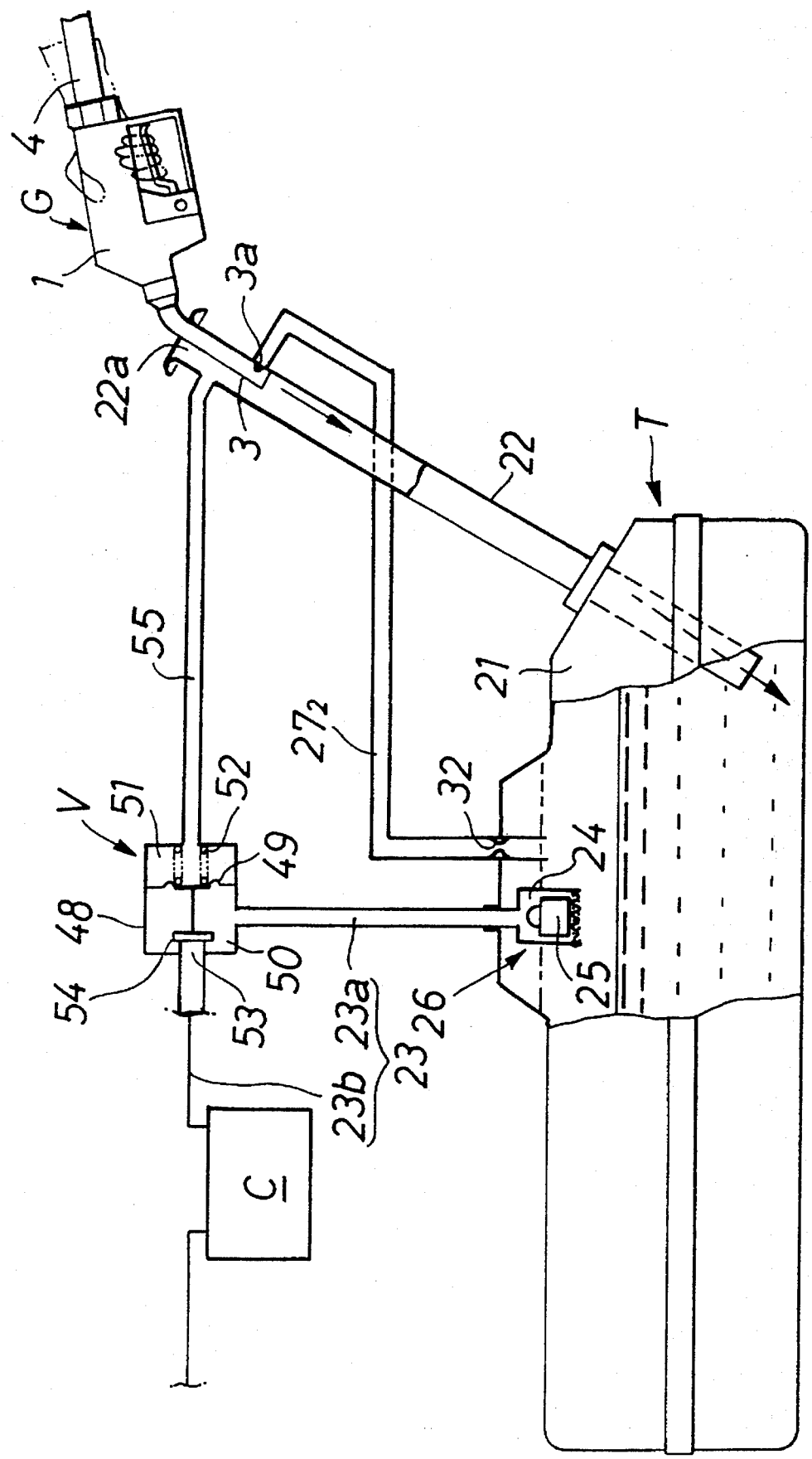
FIG. 5 is a cutaway sectional view similar to FIG. 1, but illustrating a third embodiment of the invention.

FIG. 5 illustrates a third embodiment of the present invention, wherein portions or components corresponding to those in the above-described embodiments are designated by like reference characters.

A second evaporative fuel passage $27_2$ has a cross-sectional area equal to that of the first evaporative fuel passage 23 leading to the canister C. The second evaporative fuel passage $27_2$ is connected at one end thereof to the upper space within the fuel tank T and connected at the other end to the refueling line 22 at a location corresponding to the negative pressure introducing hole 3a in the nozzle during refueling. A constriction 32 serving as a means for limiting the flow rate of evaporative fuel is provided in an intermediate portion of the second evaporative fuel passage $27_2$.

In the third embodiment, a large amount of evaporative fuel cannot flow from the second evaporative fuel passage $27_2$ into the refueling line 22, and the releasing of evaporative fuel from the refueling line 22 to the outside is more effectively prevented.

Alternatively, the constriction 32 may be provided at any location in the second evaporative fuel passage $27_2$.

Figure 6:
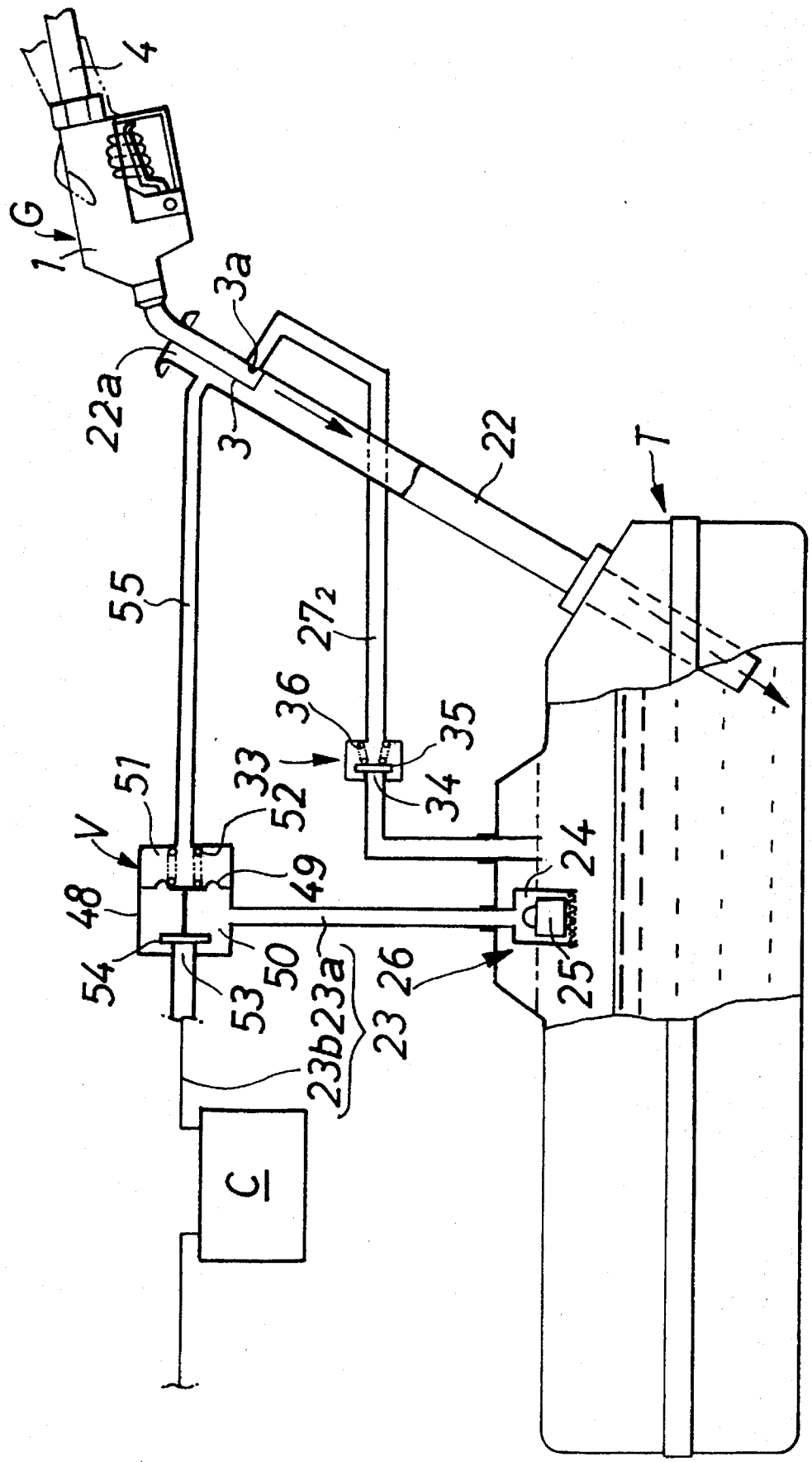
FIG. 6 is a cutaway sectional view similar to FIG. 1, but illustrating a fourth embodiment of the invention.

FIG. 6 illustrates a fourth embodiment of the present invention, wherein portions of components corresponding to those in the above-described embodiments are designated by like reference characters.

A differential pressure regulating valve 33 serving as a limiting means is incorporated in an intermediate portion of a second evaporative fuel passage $27_2$ which connects the upper space in the fuel tank T with a portion of the refueling line 22 corresponding to the negative pressure introducing hole 3a. The differential pressure regulating valve 33 includes a valve member 35 capable of opening and closing a valve bore 34 leading to an interior of the fuel tank T, and a spring 36 for biasing the valve member 35 in a direction to close the valve bore 34. When the pressure in the fuel tank T exceeds a predetermined pressure, the differential pressure regulating valve 33 is opened.

In the fourth embodiment, in order to prevent the release of evaporative fuel from the refueling opening 22a into the atmosphere when the speed of fuel supplied by the refueling nozzle G is relatively slow and the amount of air included from the refueling opening 22a is relatively small, the second evaporative fuel passage $27_2$ can be closed until the pressure in the fuel tank T exceeds the predetermined pressure.

Figure 7:
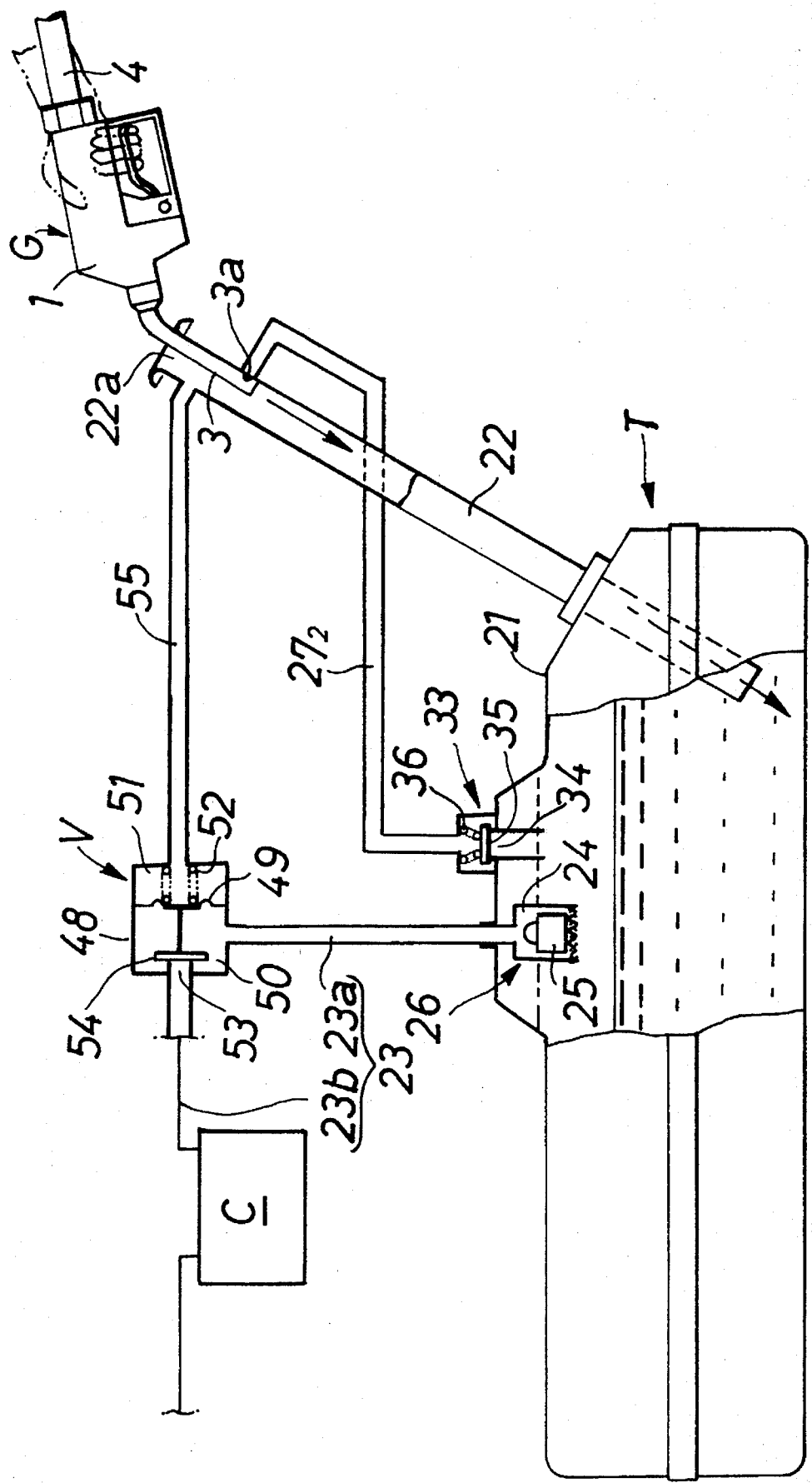
FIG. 7 is a cutaway sectional view of a modification to the fourth embodiment.

The differential pressure regulating valve 33 may be mounted at any location in the second evaporative fuel passage $27_2$, as shown in FIG. 7.

Figure 8:
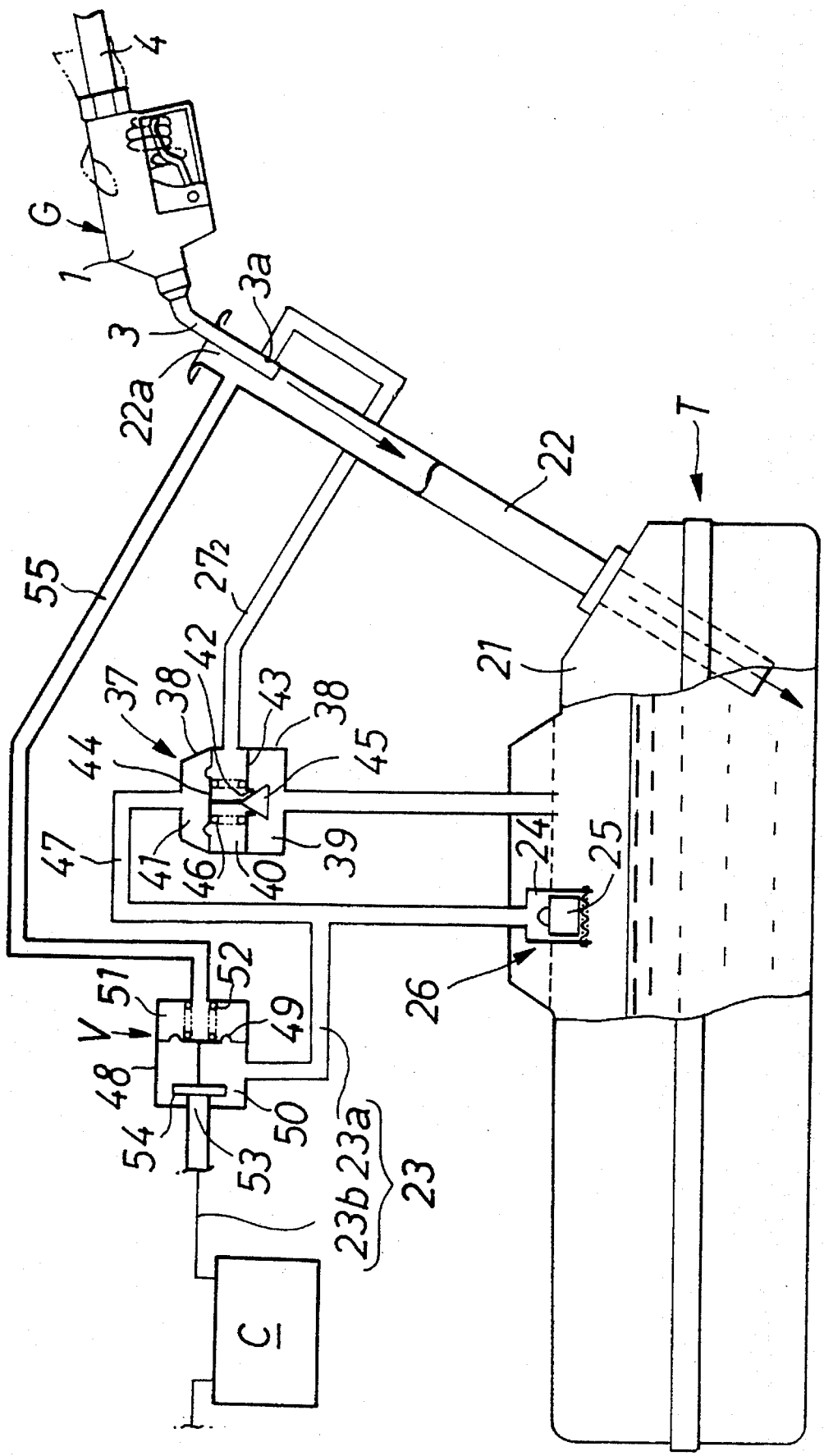
FIG. 8 is a cutaway sectional view similar to FIG. 1, but illustrating a fifth embodiment of the invention.

FIG. 8 illustrates a fifth embodiment of the present invention, wherein portions of components corresponding to those in the above-described embodiments are designated by like reference characters.

A control valve 37 serving as a limiting means is incorporated in an intermediate portion of a second evaporative fuel passage $27_2$ which connects the upper space in the fuel tank T with a portion of the refueling line 22 corresponding to the negative pressure introducing hole 3a. The control valve 37 is constructed such that the opening degree is increased as the pressure in the fuel tank T is increased. Defined in a housing 38 of the control valve 37 are a valve chest 39 leading to the upper space in the fuel tank T, a spring chamber 40 leading to the refueling line 22, and a pressure chamber 41. The valve chest 39 and the spring chamber 40 are partitioned from each other by a partition wall 43 fixedly mounted in the housing 38. The spring chamber 40 and the pressure chamber 41 are partitioned from each other by a diaphragm 44 supported at its peripheral edge by the housing 38. A valve member 45, capable of varying the opening degree of a valve bore 42 is accommodated in the valve chest 39 and connected to the diaphragm 44. A spring 46 for biasing the diaphragm 44 in a direction to reduce the volume of the pressure chamber 41 is accommodated in the spring chamber 40, and the pressure chamber 41 is in communication with an intermediate portion of the first evaporative fuel passage 23 through a pressure guiding passage 47.

In control valve 37, the diaphragm 44 is displaced downwardly as viewed in FIG. 8 in response to an increase in the pressure within the fuel tank T, i.e., the pressure in the first evaporative fuel passage 23, thereby driving the valve member 45 in a direction to increase the opening degree of the valve bore 42.

In the fifth embodiment, the flow rate of evaporative fuel flowing through the second evaporative fuel passage $27_2$ can be increased in accordance with an increase in amount of fuel supplied into the fuel tank T during refueling by the refueling nozzle G. The release of evaporative fuel from the refueling line 22 to the outside can be more effectively prevented in accordance with the amount of fuel supplied.

Figure 9:
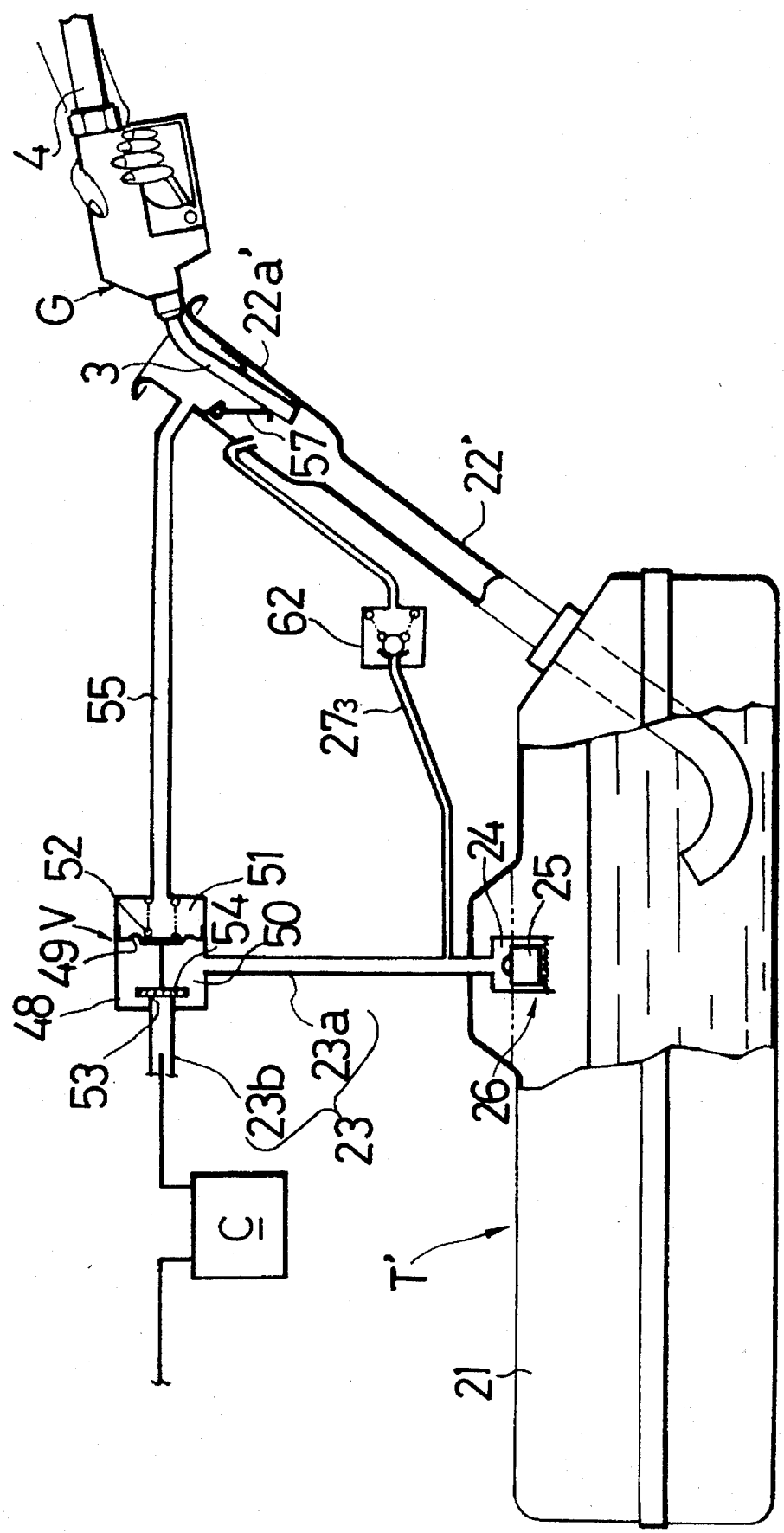
FIG. 9 is a cutaway sectional view illustrating the construction of an evaporative fuel processing device according to a sixth embodiment of the invention.
Figure 10:
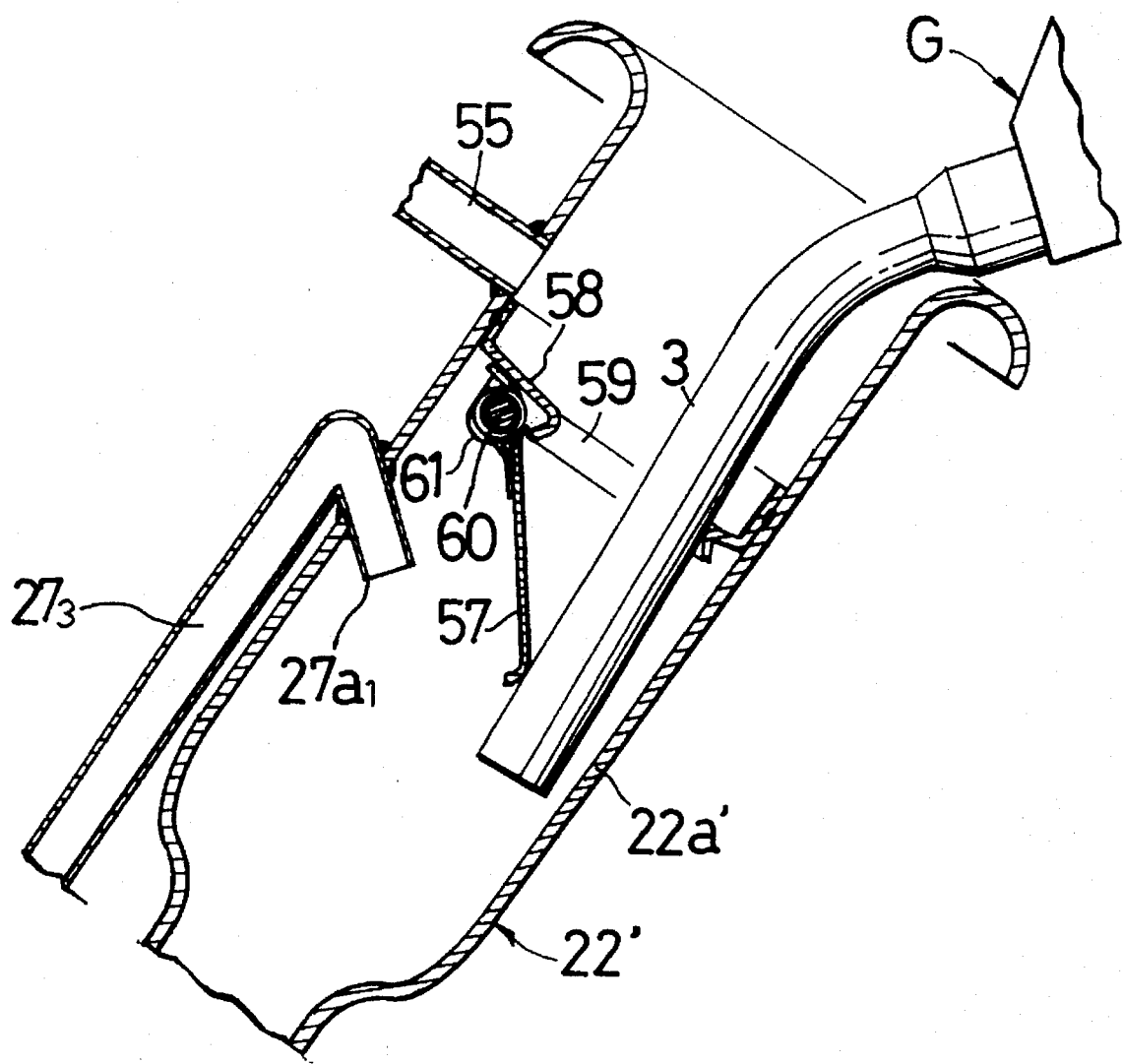
FIG. 10 is an enlarged sectional view of an inlet of a refueling line of the sixth embodiment.
Figure 11:
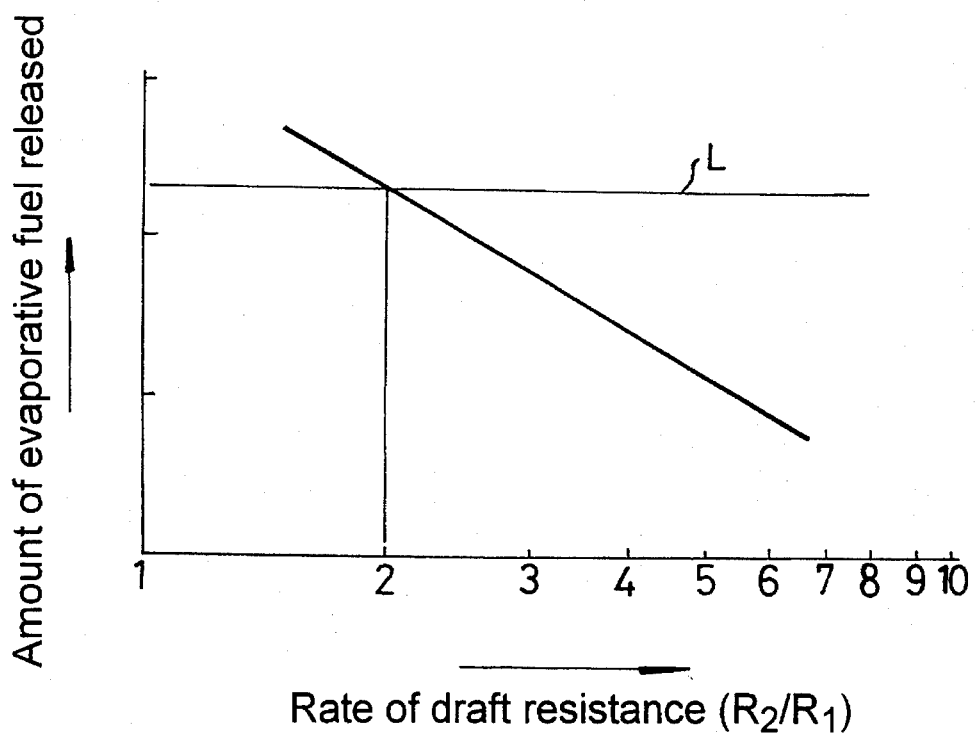
FIG. 11 is a graph illustrating the relationship between the draft resistance ratio and the amount of evaporative fuel released, for the sixth embodiment.
Figure 12:
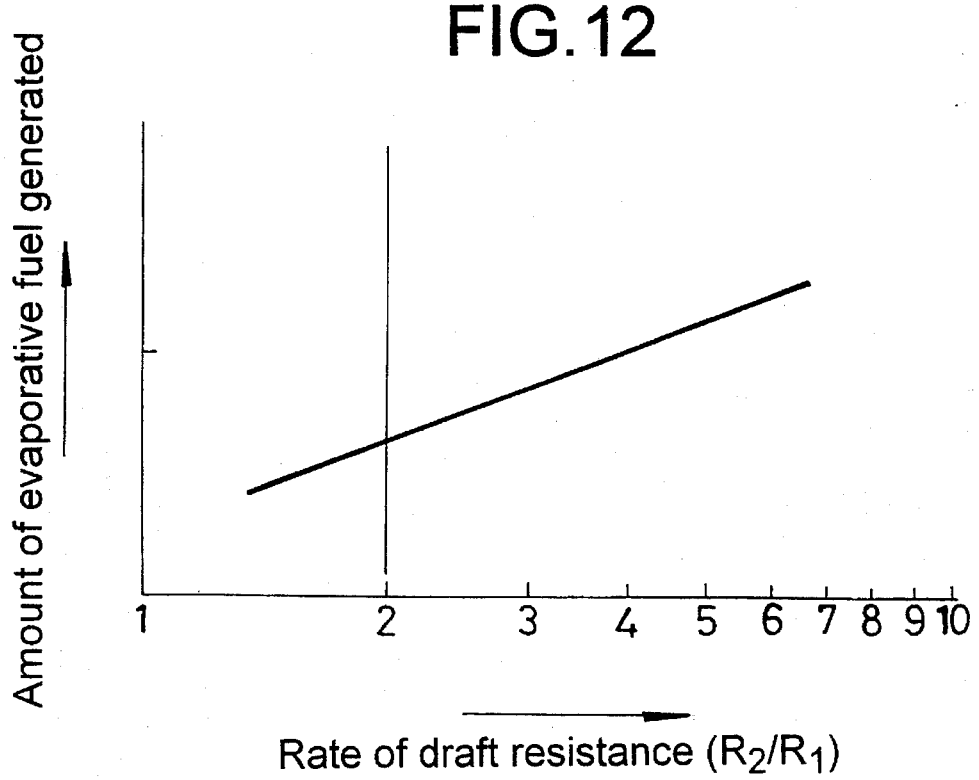
FIG. 12 is a graph illustrating the relationship between the draft resistance ratio and the amount of evaporative fuel generated within a fuel tank for the sixth embodiment.

FIGS. 9 to 12 illustrate a sixth embodiment of the present invention. FIG. 9 is a cutaway sectional view illustrating the construction of an evaporative fuel processing device; FIG. 10 is an enlarged sectional view of an inlet portion of a refueling line; FIG. 11 is a graph illustrating the relationship between the draft resistance ratio and the amount of evaporative fuel released; FIG. 12 is a graph illustrating the relationship between the draft resistance ratio and the amount of evaporative fuel generated within the fuel tank.

Referring first to FIG. 9, an inlet 22a' having a large diameter is provided on an upper end of a refueling line 22' which extends laterally and upwardly from a tank body 21 of a fuel tank T'. A spring chamber 51 in an on-off valve V is in communication with the inlet 22a' of the refueling line 22' through a communication passage 55.

Referring also to FIG. 10, when fuel is supplied into the fuel tank T', a nozzle 3 of a refueling nozzle G is inserted into the inlet 22a' of the refueling line 22'. A shutter 57 is provided in the inlet 22a' and opened in response to the insertion of the nozzle 3 into the inlet portion 22a'. More specifically, a partition wall 58 is provided on an inner surface of an intermediate portion of the inlet 22a' to divide the inside of the inlet 22a' into an inner portion and an outer portion. The partition wall 58 is provided with an insertion hole 59 into which the nozzle 3 of the refueling nozzle G can be inserted. The shutter 57 is pivotally supported on an inner surface of the partition wall 58 by a pin 60 and biased in a direction to close the insertion hole 59 from an inner side by the action of a torsion spring 61 mounted between the partition wall 58 and the shutter 57. Thus, when the nozzle 3 has been inserted into the insertion hole 59, as shown in FIG. 10, the shutter 57 is forcedly opened against a biasing force of the torsion spring 61. When the nozzle 3 has been drawn out of the insertion hole 59, the shutter 57 is turned by the action of the torsion spring 61 to a position in which it closes the insertion hole 59.

The communication passage 55 leading to the spring chamber 51 in the on-off valve V is connected to the inlet 22a' of the refueling line 22' at a location outer than the shutter 57.

Referring again to FIG. 9, a second evaporative fuel passage $27_3$ diverges from the first evaporative fuel passage 23 at a location between a float valve 26 and the on-off valve V. The second evaporative fuel passage $27_3$ is connected to the inlet 22a' of the refueling 22' at a location nearer the tank body 21 than the shutter 57. Moreover, as shown in FIG. 10, an end $27a_1$ of the second evaporative fuel passage $27_3$ opening into the inlet 22a' is formed so as to be turned, e.g., laterally and downwardly in a direction of flow of the fuel from the nozzle 3 of the refueling nozzle G.

A check valve 62 is provided in an intermediate portion of the second evaporative fuel passage $27_3$. When the pressure of evaporative fuel in the tank body 21 rises to a predetermined valve-opening pressure or more, the check valve 62 is opened to permit a flowing of evaporative fuel from the tank body 21 toward the inlet 22a' of the refueling line 22'. The pressure for opening the check valve 62 is set at a value slightly higher than the pressure for opening the on-off valve V. The check valve 62 prevents evaporative fuel from being released in a large amount via the second evaporative fuel passage $27_3$ into the atmosphere when the on-off valve V is not opened due to a lower speed (volume) of fuel supplied into the fuel tank T'. However, when the fuel supply speed is slow, this does not cause any problem even if evaporative fuel is not returned to the inlet 22a' of the refueling line 22', because the amount of evaporative fuel which is generated is small.

The draft resistance $R_2$ in the second evaporative fuel passage $27_3$ is set to be larger than the draft resistance $R_1$ in the first evaporative fuel passage 23, for example, by determining the diameter of the second evaporative fuel passage $27_3$ at a small value. If the draft resistance $R_2$ of the second evaporative fuel passage $27_3$ is increased, the amount of that portion of evaporative fuel generated in the tank body 21 during refueling by the refueling nozzle G, which flows toward the second evaporative fuel passage $27_3$ is suppressed. As the ratio of the draft resistance $R_2$ of the second evaporative fuel passage $27_3$ to the draft resistance $R_1$ of the first evaporative fuel passage 23 is increased, the amount of evaporative fuel released from the refueling line 22' to the outside is decreased, as shown in FIG. 11. In this case, the amount of evaporative fuel released becomes an acceptable level or lower, when the draft resistance ratio ($R_2/R_1$) is 2 or more. It is desirable that the draft resistance $R_2$ in the second evaporative fuel passage $27_3$ is 2 or more times larger than the draft resistance $R_1$ of the first evaporative fuel passage 23.

Much of evaporative fuel passed from the second evaporative fuel passage $27_3$ to the inlet $22a'$ of the refueling line $22'$ is circulated into the tank body 21, together with the fuel flow from the nozzle 3 of the refueling nozzle G entrained therein. Evaporative fuel newly generated in the tank body 21 is increased in accordance with an increase of fresh air attendant with a decrease of evaporative fuel circulated. In other words, as the ratio of the draft resistance $R_2$ of the second evaporative fuel passage $27_3$ to the draft resistance $R_1$ of the first evaporative fuel passage 23 is increased, the amount of evaporative fuel which is newly generated in the tank body 21 is increased. If the amount of evaporative fuel passed from the second evaporative fuel passage $27_3$ to the refueling line $22'$ is suppressed, much of the remaining amount of evaporative fuel is passed via the first evaporative fuel passage 23 to the canister C. Therefore, the capacity of the canister C must be increased. Thus, from the viewpoint of suppression of the amount of evaporative fuel released, it is desirable that the draft resistance ratio $(R_2/R_1)$ is 2 or more. But in an actual case, it is not preferable that the capacity of the canister C becomes too large. From this viewpoint, the draft resistance $R_2$ of the second evaporative fuel passage $27_3$ is set such that the draft resistance ratio $(R_2/R_1)$ is set 2 or more, but not to significantly exceed 2.

The operation of the sixth embodiment will be described below. During supply of the fuel of the fuel tank T' at a usual supply speed by the refueling nozzle G, the float valve 26 and the on-off valve V are open. Thus, evaporative fuel generated in the fuel tank T' is introduced through the first evaporative fuel passage 23 to the canister C and at the same time through the second evaporative fuel passage $27_3$ to the inlet $22a'$ of the refueling line $22'$. The open end $27a_1$ of the second evaporative fuel passage $27_3$ into the refueling line $22'$ is defined such that it is turned laterally and downwardly in a direction of flow of the fuel from the nozzle 3. Therefore, much of the evaporative fuel from the second evaporative fuel passage $27_3$ is circulated into the tank body 21, together with the fuel flow from the nozzle 3. Moreover, the draft resistance $R_2$ of the second evaporative fuel passage $27_3$ is set to be larger than the draft resistance $R_1$ of the first evaporative fuel passage 23. Therefore, the amount of evaporative fuel passed into the second evaporative fuel passage $27_3$ can be limited to suppress the amount of evaporative fuel released from the refueling line $22'$ to the atmosphere.

In addition, the second evaporative fuel passage $27_3$ is connected to the inlet $22a'$ of the refueling line $22'$ at the location nearer the tank body 21 than the shutter 57. Therefore, evaporative fuel from the second evaporative fuel passage $27_3$ can be more effectively combined with the fuel flow from the nozzle 3, thereby more effectively suppressing the release of evaporative fuel to the outside.

The float valve 26 is closed to close the first evaporative fuel passage 23 in response to the fuel liquid level in the tank body 21 reaching a highest level. The second evaporative fuel passage $27_3$ diverges from the first evaporative fuel passage 23 at a location downstream from the float valve 26. Therefore, it is possible to define the highest fuel liquid level in the tank body 21 by only the float valve 26, thereby easily enhancing the setting accuracy of the highest fuel liquid level, as compared with the case where the second evaporative fuel passage $27_3$ is connected to the tank body 21 independently from the first evaporative fuel passage 23.

Figure 13:
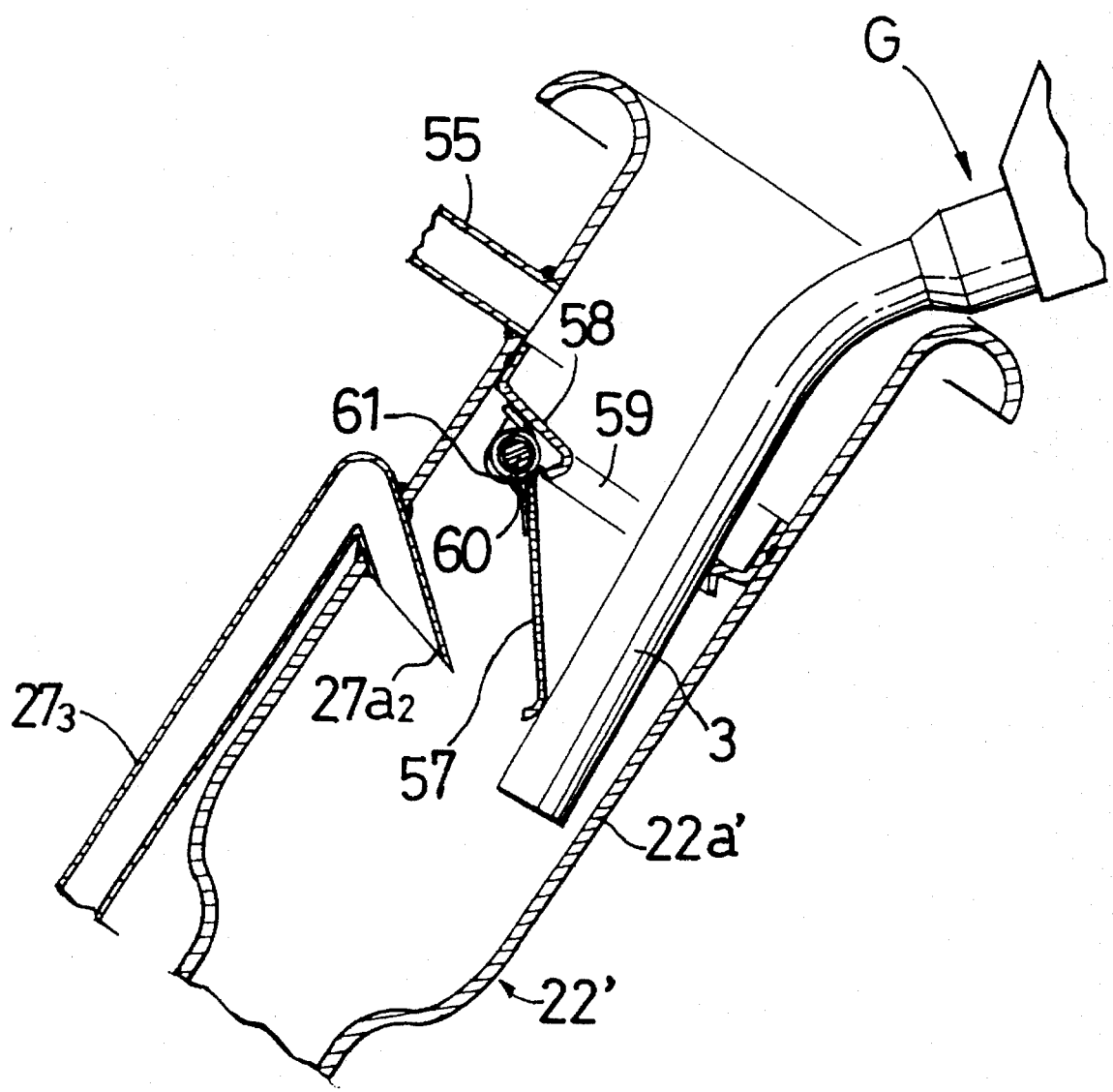
FIG. 13 is a sectional view similar to FIG. 10, but illustrating a first modification to the sixth embodiment.
Figure 14:
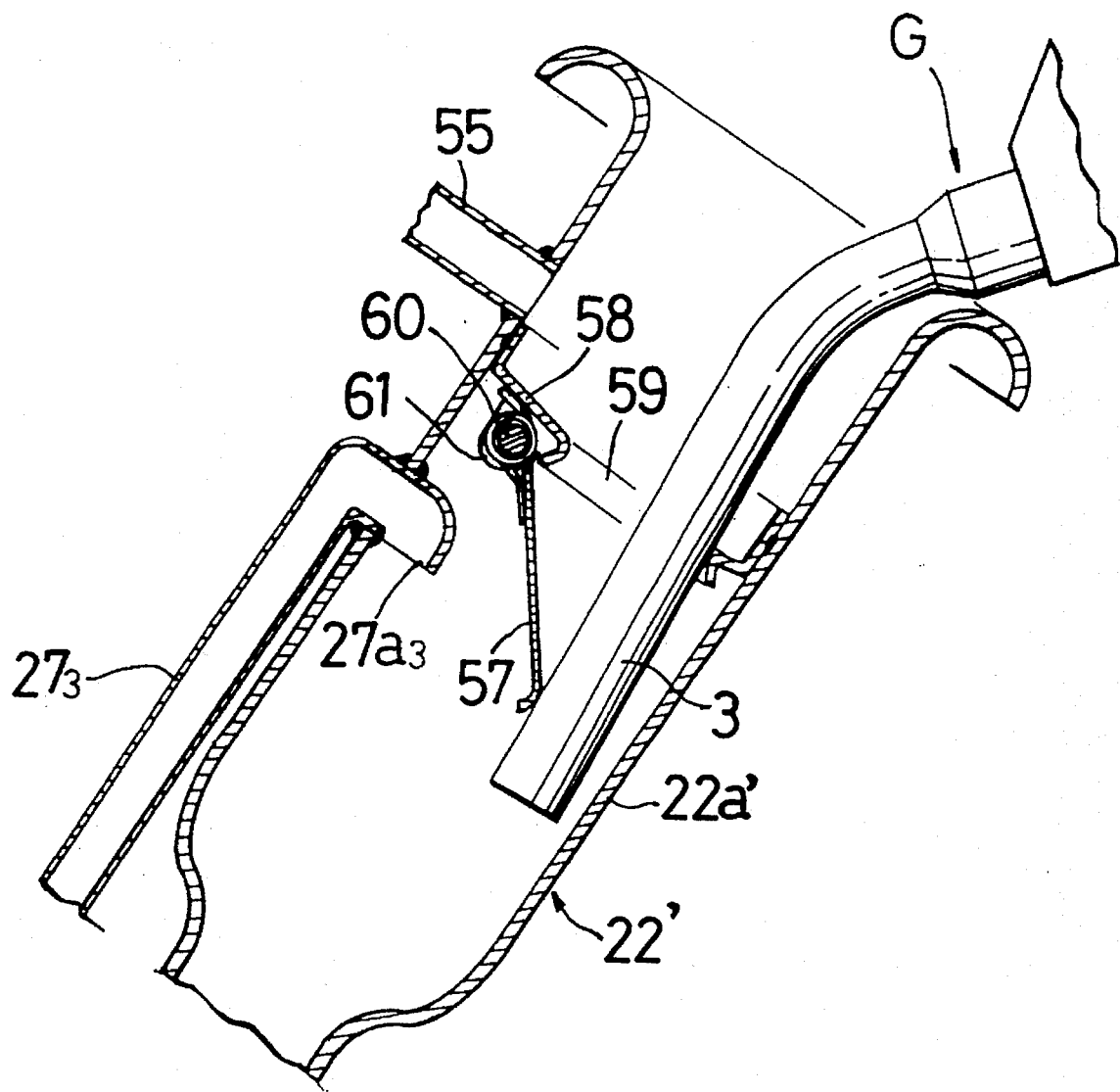
FIG. 14 is a sectional view similar to FIG. 10, but illustrating a second modification to the sixth embodiment.
Figure 15:
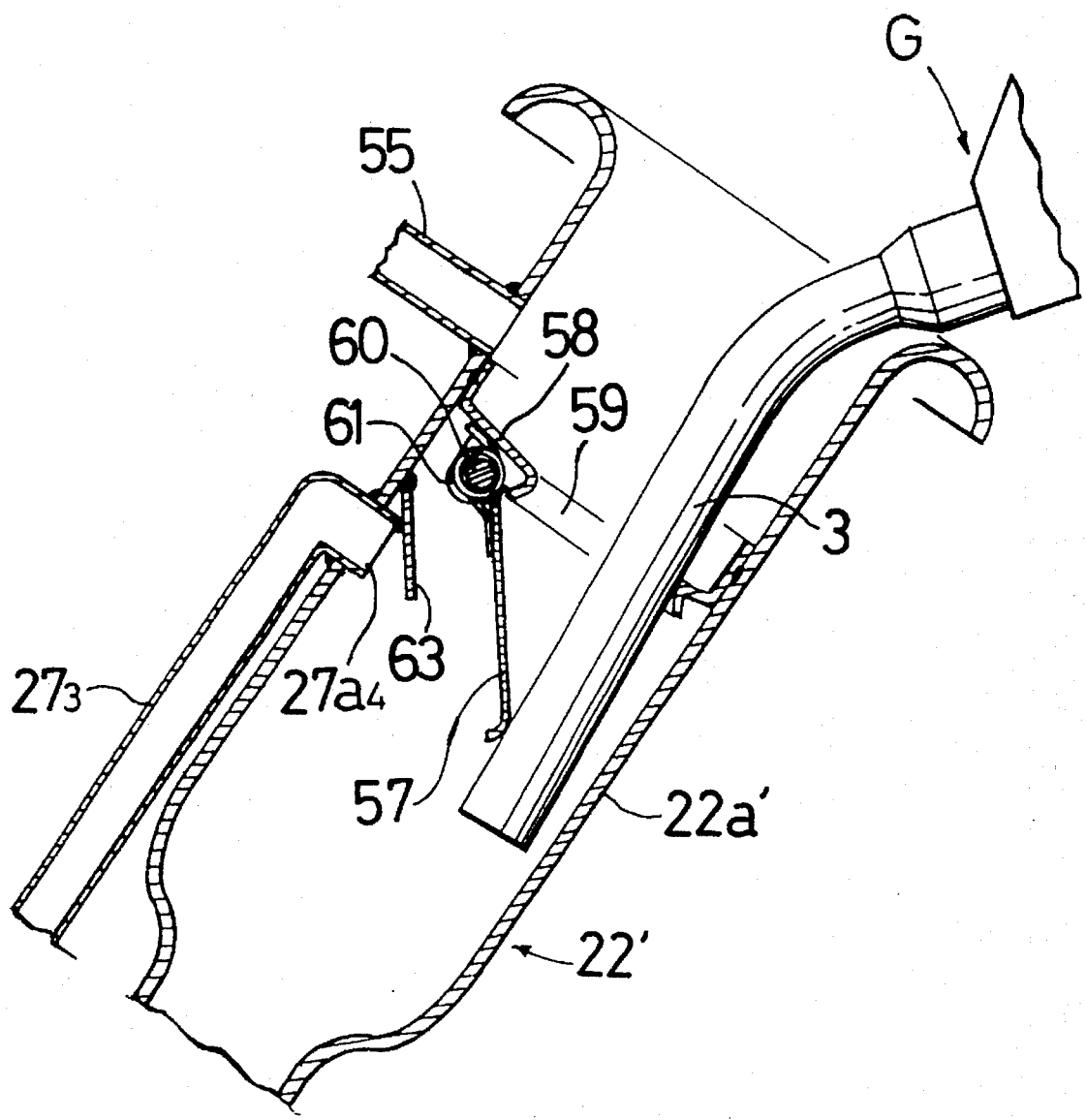
FIG. 15 is a sectional view similar to FIG. 10, but illustrating a third modification to the sixth embodiment.

As in a first modification shown in FIG. 13, an open end $27a_2$ of the second evaporative fuel passage $27_3$ into the inlet $22a'$ may be formed so that it is cut obliquely and turned laterally and downwardly. As in a second modification shown in FIG. 14, an open end $27a_3$ of the second evaporative fuel passage $27_3$ into the inlet $22a'$ may be formed so that it is bent into a substantially U-shape and turned downwardly. Further, as in a third modification shown in FIG. 15, an open end $27a_4$ of the second evaporative fuel passage $27_4$ into the inlet $22a'$ may be formed so that it is connected at a substantially right angle to the inlet $22a'$ and a baffle 63 may be mounted on an inner surface of the inlet $22a'$ above the open end $27a_4$.

Although the embodiments of the present invention have been described in detail, it will be understood that the present invention is not limited to these embodiments, and various modifications and variations may be made without departing from the spirit and scope of the invention defined in the claims.

What is claimed is:

1. An evaporative fuel processing device, comprising:

a fuel tank having a refueling line extending upwardly therefrom, said refueling line being configured to have a refueling nozzle inserted therein;

a canister communicatively connected to said fuel tank for adsorbing evaporative fuel from said fuel tank; and an on-off valve which is opened during a refueling operation to permit the communication between said fuel tank and said canister;

said evaporative fuel processing device further comprising an evaporative fuel passage communicating at one end thereof with an upper portion of an interior of said fuel tank and connected at another end to said refueling line, wherein said refueling nozzle includes a nozzle portion and is configured such that refueling is automatically stopped in response to a fuel liquid level reaching a negative pressure inducing hole provided in a lower portion of a tip end of said nozzle in a state where said nozzle portion is inserted into the refueling line, and wherein said another end of said evaporative fuel passage is connected to the refueling line at a location which corresponds to the negative pressure introducing hole of the refueling nozzle during the refueling operation.

2. An evaporative fuel processing device according to claim 1, wherein said evaporative fuel passage has a cross-sectional area which limits a flow of evaporative fuel.

3. An evaporative fuel processing device according to claim 1, wherein said evaporative fuel passage includes a limiting means for limiting a flow of evaporative fuel.

4. An evaporative fuel processing device, comprising:

a fuel tank having a refueling line extending upwardly therefrom, said refueling line being configured to have a refueling nozzle inserted therein;

a canister communicatively connected to said fuel tank for adsorbing evaporative fuel from said fuel tank; and an on-off valve which is opened during a refueling operation to permit the communication between said fuel tank and said canister;

said evaporative fuel processing device further comprising an evaporative fuel passage communicating at one end thereof with an upper portion of an interior of said fuel tank and connected at another end to said refueling line; and a guide member onto which a tip end of said nozzle is placed during refueling and which is mounted within said refueling line, said guide member including a plurality of connection holes at predetermined distances from one another in an axial direction of said refueling line to commonly lead to said evaporative fuel passage.

5. An evaporative fuel processing device, comprising:

a fuel tank including a tank body and a refueling line mounted to said tank body and extending upwardly therefrom;

a canister connected to said tank body for adsorbing evaporative fuel from said tank body;

a first evaporative fuel passage which communicatively interconnects said tank body and said canister; and a second evaporative fuel passage which interconnects an inlet end of said refueling line and said tank body; wherein a draft resistance of said second evaporative passage during refueling is larger than that of said first evaporative fuel passage; and shutter mounted in the inlet end of said refueling line, said shutter configured to be opened in response to the insertion of a refueling nozzle into said refueling line, wherein said second evaporative fuel passage is connected to said refueling line at a location between said tank body and said shutter, and wherein an end of said second evaporative fuel passage which is connected to said refueling line is configured to be open in downward direction, toward said tank body.

6. An evaporative fuel processing device according to claim 5, further including a valve cooperating with said first evaporative fuel passage and said tank body, wherein said valve closes in response to the fuel liquid level within said tank body reaching a highest level, thereby closing said first evaporative fuel passage, and wherein said second evaporative fuel passage diverges from said first evaporative fuel passage at a location downstream from said valve.

7. An evaporative fuel processing device, comprising:

fuel tank including a tank body and a refueling line mounted to said tank body and extending upwardly therefrom;

a canister connected to said tank body for adsorbing evaporative fuel from said tank body;

a first evaporative fuel passage which communicatively interconnects said tank body and said canister; and a second evaporative fuel passage which interconnects an inlet end of said refueling line and said tank body; wherein a draft resistance of said second evaporative passage during refueling is larger than that of said first evaporative fuel passage; and a check valve connected to said second evaporative fuel passage, said check valve permitting flow of evaporative fuel from the tank body toward the refueling line at a predetermined rate, and preventing the flow of evaporative fuel during a period of reduced fuel supply.

8. An evaporative fuel processing device according to claim 5, further comprising a valve connected between said canister and said first evaporative fuel passage and configured to be open during a refueling operation for allowing the canister to communicate with the first evaporative fuel passage.

9. An evaporative fuel processing device according to claim 8, wherein said valve is connected to said refueling line via a communication passage, and wherein pressure communicated from the refueling line to the valve via the communication passage enables the valve to be in an open condition during refueling.

* * * * *